United States Patent
Kamruzzaman

(10) Patent No.: US 10,552,325 B2
(45) Date of Patent: *Feb. 4, 2020

(54) REDUCING WRITE-BACKS TO MEMORY BY CONTROLLING THE AGE OF CACHE LINES IN LOWER LEVEL CACHE

(71) Applicant: Western Digital Technologies, Inc., San Jose, CA (US)

(72) Inventor: Md Kamruzzaman, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,563

(22) Filed: Apr. 20, 2018

(65) Prior Publication Data

US 2018/0239703 A1    Aug. 23, 2018

Related U.S. Application Data

(63) Continuation of application No. 14/927,410, filed on Oct. 29, 2015, now Pat. No. 9,952,973.

(51) Int. Cl.
*G06F 12/00* (2006.01)
*G06F 12/0831* (2016.01)
(Continued)

(52) U.S. Cl.
CPC ...... *G06F 12/0833* (2013.01); *G06F 12/0804* (2013.01); *G06F 12/0806* (2013.01);
(Continued)

(58) Field of Classification Search
CPC ............ G06F 12/0833; G06F 12/0806; G06F 12/122; G06F 12/128; G06F 12/0804;
(Continued)

(56) References Cited

U.S. PATENT DOCUMENTS

| 5,043,885 A | 8/1991 | Robinson |
| 5,734,861 A | 3/1998 | Cohn et al. |

(Continued)

FOREIGN PATENT DOCUMENTS

| CN | 107085556 A | 8/2017 |
| WO | 2012124034 A1 | 9/2012 |

OTHER PUBLICATIONS

Lee, et al.; The University of Texas at Austin; DRAM-Aware Last-Level Cache Writeback: Reducing Write-Caused Interference in Memory Systems; dated Apr. 2010; 21 total pages.

(Continued)

*Primary Examiner* — Mark A Giardino, Jr.
(74) *Attorney, Agent, or Firm* — Patterson & Sheridan, LLP; Steven H. Versteeg

(57) ABSTRACT

A method and apparatus for reducing write-backs to memory is disclosed herein. The method includes determining whether a read/write request entering a lower level cache is a cache line containing modified data, and responsive to determining that the read/write request is not a cache line containing modified data, manipulating age information of the cache line to reduce a number of write-backs to memory.

26 Claims, 6 Drawing Sheets

(51) Int. Cl.
  *G06F 12/0804* (2016.01)
  *G06F 12/123* (2016.01)
  *G06F 12/0806* (2016.01)
  *G06F 12/122* (2016.01)
  *G06F 12/128* (2016.01)
  *G06F 13/00* (2006.01)
  *G06F 13/28* (2006.01)
  *G06F 12/12* (2016.01)

(52) U.S. Cl.
  CPC .......... *G06F 12/122* (2013.01); *G06F 12/123* (2013.01); *G06F 12/128* (2013.01); *G06F 12/12* (2013.01); *G06F 2212/1016* (2013.01); *G06F 2212/1021* (2013.01); *G06F 2212/621* (2013.01)

(58) Field of Classification Search
  CPC .. G06F 12/123; G06F 2212/621; G06F 12/12; G06F 2212/1016; G06F 2212/1021
  See application file for complete search history.

(56) References Cited

U.S. PATENT DOCUMENTS

| | | | |
|---|---|---|---|
| 5,978,951 | A | 11/1999 | Lawler et al. |
| 5,996,048 | A * | 11/1999 | Cherabuddi ........ G06F 12/0811 711/119 |
| 6,484,237 | B1 * | 11/2002 | Agarwala ........... G06F 12/0831 711/122 |
| 7,337,276 | B2 | 2/2008 | Accapadi et al. |
| 7,366,855 | B2 | 4/2008 | Kim et al. |
| 7,577,795 | B2 | 8/2009 | Hutton et al. |
| 7,966,456 | B2 | 6/2011 | Trika et al. |
| 8,539,159 | B2 | 9/2013 | Chauvel et al. |
| 8,930,630 | B2 | 1/2015 | Park |
| 2002/0152361 | A1 | 10/2002 | Dean et al. |
| 2003/0084249 | A1 | 5/2003 | Johnson et al. |
| 2003/0149845 | A1 | 8/2003 | Fu |
| 2005/0172082 | A1 | 8/2005 | Liu |
| 2006/0026372 | A1 | 2/2006 | Kim et al. |
| 2013/0254491 | A1 | 9/2013 | Coleman et al. |
| 2013/0346702 | A1 | 12/2013 | Hondo |
| 2016/0026372 | A1 | 1/2016 | Arvindam et al. |
| 2016/0203085 | A1 | 7/2016 | Kranich et al. |
| 2017/0123984 | A1 | 5/2017 | Kamruzzaman |

OTHER PUBLICATIONS

Korean Office Action (with attached English translation of the Summary) for Application No. 10-2016-0141955; dated Dec. 27, 2017; 6 total pages.
Office Action issued in corresponding Japanese Patent Application No. 2016-211972, dated Feb. 27, 2018 (13 pages).
Office Action issued in corresponding Japanese Patent Application No. 2016-211972, dated Oct. 30, 2018 (6 pages).
Written Opinion issued in corresponding Japanese Patent Application No. 2016-211972, dated May 23, 2018 (4 pages).
Office Action issued in corresponding Japanese Patent Application No. 2016211972, dated Feb. 16, 2018 (9 pages).

* cited by examiner

REDUCING WRITE-BACKS TO MEMORY BY CONTROLLING THE AGE OF CACHE LINES IN LOWER LEVEL CACHE

CROSS-REFERENCE TO RELATED APPLICATIONS

This application is a continuation of co-pending U.S. patent application Ser. No. 14/927,410, filed Oct. 29, 2015, which is herein incorporated by reference.

BACKGROUND OF THE DISCLOSURE

Field of the Disclosure

Embodiments of the present disclosure generally relate to storage class memory, and more specifically to a management method for reducing write-backs to memory.

Description of the Related Art

Emerging storage class memory (Phase Change Memories, Spin Transfer Torque Random Access Memory, etc.) technologies have dynamic random access memory (DRAM), or better, read latency. This results in emerging storage class memory as a compelling addition to the processor memory hierarchy, either as a replacement of DRAM, a hybrid memory, or even a replacement of last level cache. A difficulty that arises, however, is slow write latency and endurance in storage class memories. Any delay in the write will directly impact the performance of applications. Similarly, write frequency in the processor memory hierarchy is several orders of magnitude higher than that in the persistence storage.

Therefore, in order to use storage class memory as a DRAM replacement or in a hybrid main memory system, there is a need to control the total number of writes as well as limit the write bandwidth requirements.

SUMMARY OF THE DISCLOSURE

The present disclosure generally relates to a method and apparatus for reducing write-backs to memory. The method includes determining whether a read request entering a lower level cache is a cache line containing modified data, and responsive to determining that the read request is not a cache line containing modified data, manipulating age information of the cache line to reduce a number of write-backs to memory.

In one embodiment, a method for reducing write-backs to memory is disclosed herein. The method includes determining whether a read request entering a lower level cache is a cache line containing modified data, and responsive to determining that the read request is not a cache line containing modified data, manipulating age information of the cache line to reduce a number of write-backs to memory.

In another embodiment, a system for reducing write-backs to memory is disclosed herein. The system includes a processor and a memory. The memory stores program code, which, when executed on the processor, performs an operation for managing memory. The operation includes determining whether a read request entering a lower level cache is a cache line containing modified data, and responsive to determining that the read request is not a cache line containing modified data, manipulating age information of the cache line to reduce a number of write-backs to memory.

In another embodiment, a computer readable storage medium is disclosed herein. The computer readable storage medium has stored thereon instructions that when executed by a processor causes a processor to perform an operation for managing memory. The operation includes determining whether a read request entering a lower level cache is a cache line containing modified data, and responsive to determining that the read request is not a cache line containing modified data, manipulating age information of the cache line to reduce a number of write-backs to memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and apparatus for reducing write-backs to memory. The method includes determining whether a read request entering a lower level cache is a cache line containing modified data, and responsive to determining that the read request is not a cache line containing modified data, manipulating age information of the cache line to reduce a number of write-backs to memory.

Figure 1:
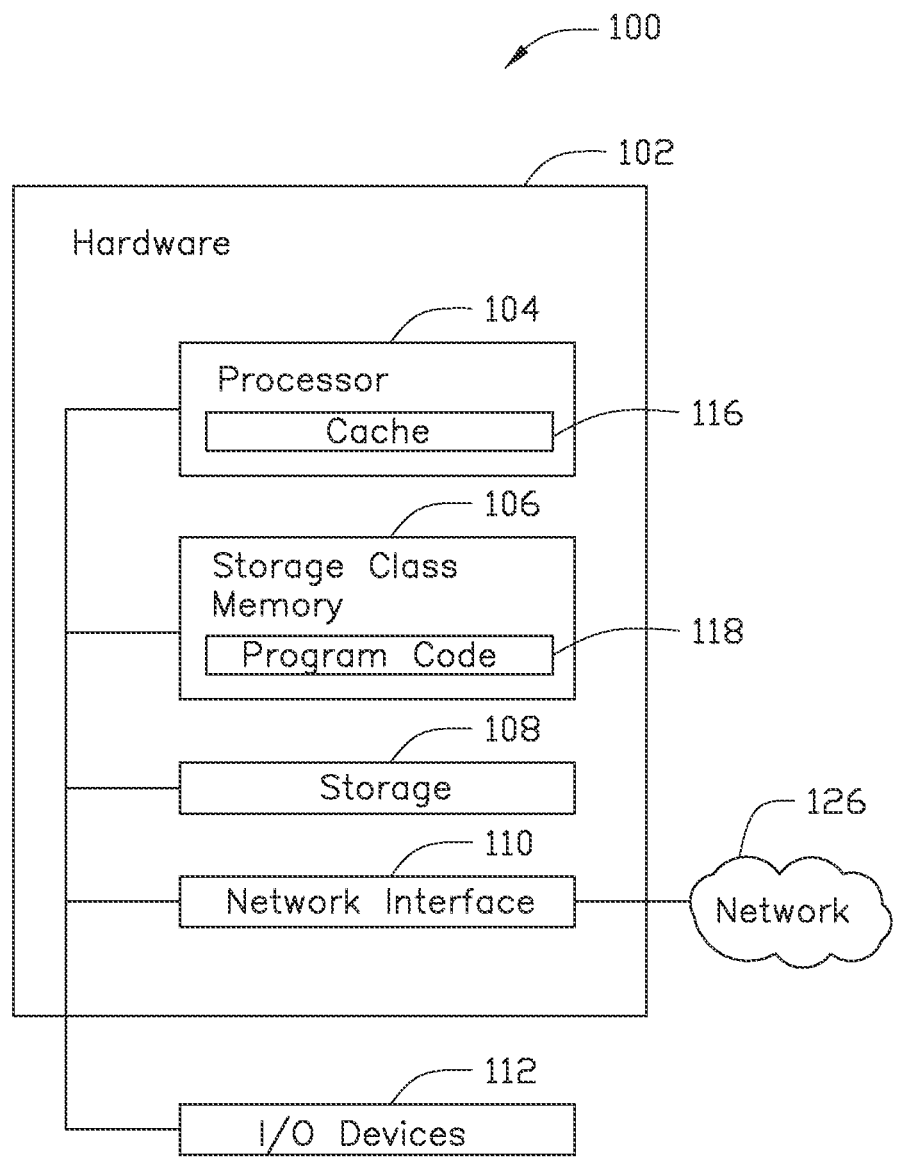
FIG. 1 illustrates a computing system, according to one embodiment.

FIG. 1 illustrates a computing system 100, according to one embodiment. The computing system 100 includes hardware components 102, including a processor 104, a memory 106, storage 108, and a network interface 110. The computing system 100 also includes an I/O device 112 (e.g. keyboard and mouse devices) connected to the computing system 100.

In one embodiment, the processor 104 retrieves and executes programming instructions stored in memory 106 (e.g. program code 118) as well as stores and retrieves application data residing in the memory 106. The processor 104 is included to be representative of a single processor, multiple processors, a single processor having multiple processing cores, and the like. The processor 104 includes a plurality of hardware modules, such as a cache 116. The cache 116 stores data so that future requests for that data can be served faster. For example, the data stored in the cache 116 may be the results of an earlier computation, or duplicates of data stored elsewhere.

In one embodiment, the memory 106 is generally included to be representative of a storage class memory. Storage class memory includes those forms of computer memory that are non-volatile, i.e. computer memory that can retrieve stored information even after having been power cycled. For example, the memory 106 may be read-only memory, flash memory, ferroelectric random access memory (F-RAM), and the like. The memory 106 includes program code 118 having a plurality of programming instructions. For example, the plurality of programming instructions may include program code for reducing write-backs from cache 116 to memory 106.

The storage 108 may be a disk drive storage device. Although shown as a single unit, the storage 108 may be a combination of fixed and/or removable storage devices, such as fixed disk drives, removable memory cards, optical storage, network attached storage (NAS), or storage-area-network (SAN). The network interface 110 may be any type of network communications allowing the computing system 100 to communicate with other computers via a network 126.

Figure 2:
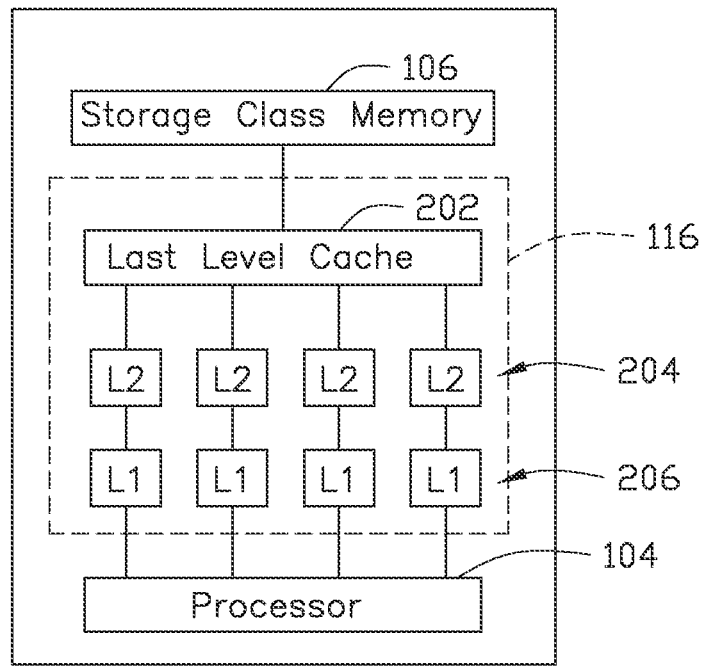
FIG. 2 illustrates a detailed view of the cache, according to one embodiment.

FIG. 2 illustrates a detailed view of the cache 116, according to one embodiment. The cache 116 includes three levels: a last level (or lower level or L3) cache 202, a level two (L2) cache 204, and a level one (L1) cache 206. The L1 cache 206 is the quickest cache, but also the smallest cache. The L2 cache 204 is slower than the L1 cache 206 but has a larger capacity than the L1 cache 206. The L3 cache 202 is the slowest cache in cache 116. The L3 cache 202 is also the largest cache in cache 116. In modern processors, the L1 cache 206, the L2 cache 204, and lower level cache 202 are managed by the processor (such as processor 104 in FIG. 1) itself. Processors try to keep the frequently access data (i.e. cache lines) in caches to avoid going to the storage class memory 106. The most frequently accessed data is stored in L1 cache 206. Whenever a data, or cache line, is not found in the cache 116, the processor 104 brings the data from the memory 106 and keeps the cache line in the cache 116. To make room for the new cache line in the cache 116, an existing cache line in the cache 116 needs to be displaced from the cache 116.

Figure 3:
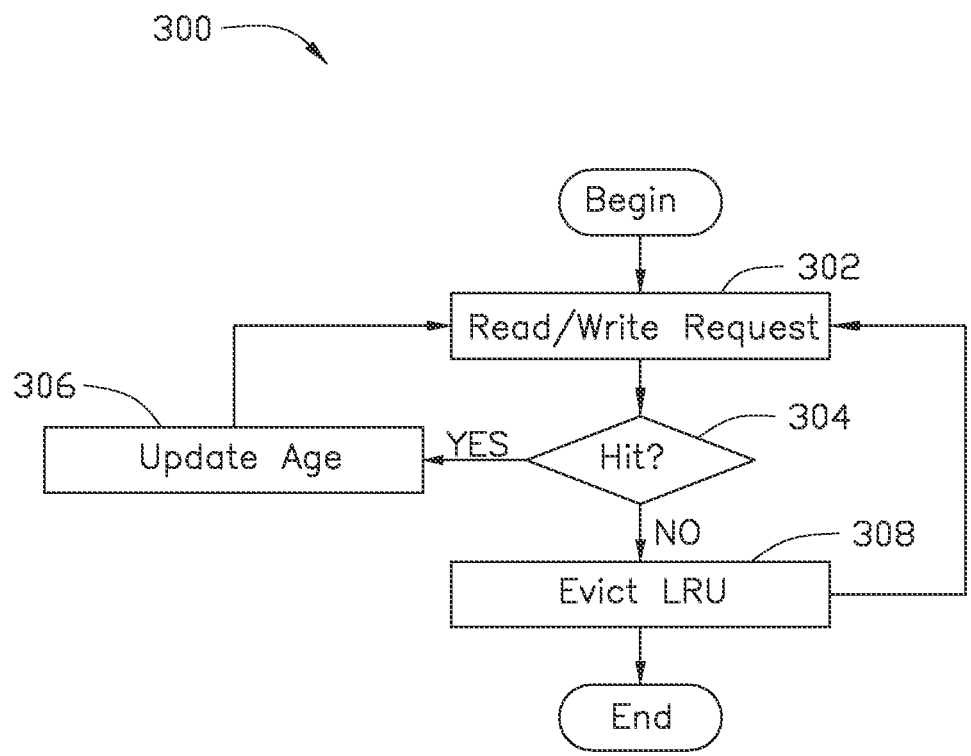
FIG. 3 illustrates a conventional method for displacing a cache line from the cache when the processor brings a new cache line into the cache, according to one embodiment.

FIG. 3 illustrates a conventional method 300 for displacing a cache line from the cache 116 when the processor 104 brings a new cache line into the cache 116, according to one embodiment. The method 300 begins at step 302. At step 302, a read/write request comes to the lower level cache from the processor. At decision block 304, the processor determines whether there is a cache hit. A cache hit occurs when the cache line requested is already in the lower level cache. If a cache hit occurs, then at step 306, the processor updates an age information of the cache line. For example, a cache line with an age of 0 is older than a cache line having an age of 1. This would mean that the cache line having an age of 1 is more frequently accessed than the cache line having the age of 0.

If however, at decision block 304, the processor determines that there is not a cache hit, then at step 308 the processor evicts a least recently used cache line from the cache to make room for the new cache line. The least recently used cache line is a cache line that is the oldest, or one of the oldest, cache lines in the cache.

The least recently used eviction policy does not distinguish, however, between a "clean" cache line and a "dirty" cache line. A "dirty" cache line is a cache line that contains modified data, i.e. contains data that was modified within the cache only. A "clean" cache line is a cache line that does not contain any modified data, i.e. only contains data that was not modified within the cache. The least recently used eviction policy only prioritizes the age information about the cache line, i.e. when the cache line is last used. The least recently used policy works well with volatile based main memory systems, because the read/write latency in volatile based main memory is about the same. However, for a storage class memory, write may be a lot slower than in volatile based main memory. Thus, a least recently used eviction policy may not be optimal because writing dirty data back in the storage class memory may take much longer and can eventually block computation.

Figure 4:
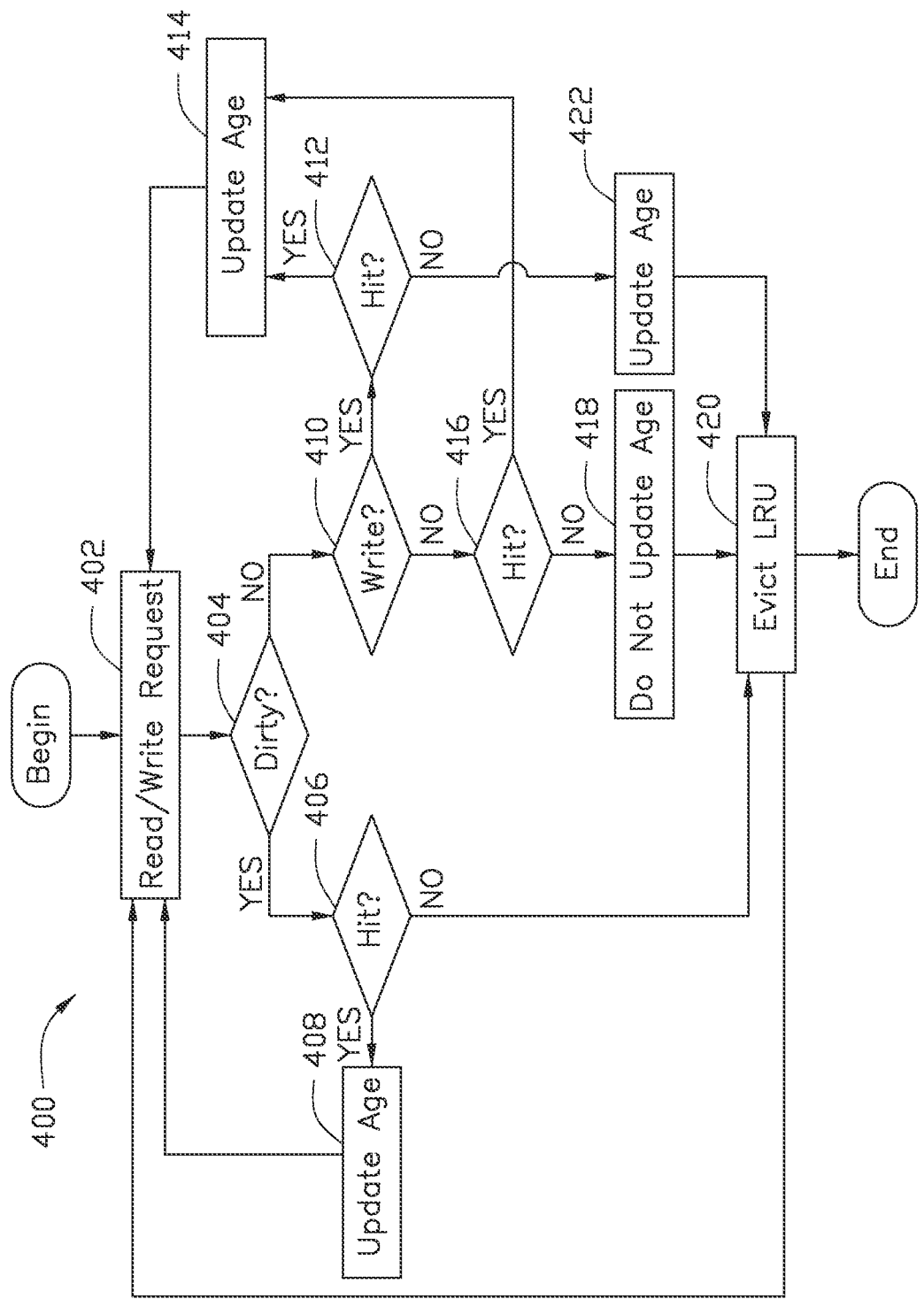
FIG. 4 illustrates an improved method for evicting cache lines from the lower level cache, according to one embodiment.

FIG. 4 illustrates an improved method 400 for evicting cache lines from the lower level cache, according to one embodiment. The method begins at step 402. At step 402, a read/write request comes to the lower level cache. At decision block 404, the processor determines whether the cache line is a clean cache line or a dirty cache line. If the cache line is a dirty cache line, then at decision block 406, the processor determines, whether there was a cache hit. If there was a cache hit, then at step 408, the processor updates the age of the cache line already in the lower level cache. If there was not a cache hit, then at step 420, the processor evicts the least recently used cache line because the read/write request is a new cache line entering the lower level cache.

If, however, at decision block 404 the processor determines that the cache line is a clean cache line, then at decision block 410 the processor determines whether the request is a read request or a write request. If the processor determines that the request was a write request, then the method moves to decision block 412 because cache lines for a write request will eventually become dirty, and a traditional least recently used approach should be used. At decision block 412, the processor determines whether a cache hit has occurred. If a cache hit has occurred, then at step 414 the age information of the cache line is updated. If, however, the processor determines that a cache hit has not occurred, then at step 422, the age information of the cache line is updated and at step 420 the least recently used cache line is evicted from the lower level cache.

If at decision block 410, the processor determines that the request was a read request, then the method moves to decision block 416. At decision block 416, the processor determines whether a cache hit has occurred. If a cache hit has occurred, then the age information of the cache line is updated at step 414. If at decision block 416, the processor determines that a cache hit has not occurred, then at step 418 the processor does not update the age information of the cache line. The processor may, for example, assign the cache line a zero age. Essentially, method 400 is manipulating age information of the clean cache lines to decipher between clean cache lines that are accessed once and never reused, and those clean cache lines that are frequently accessed.

After the processor does not update the age information of the cache line, then at step 420 the processor evicts the least recently used cache line.

Figure 5:
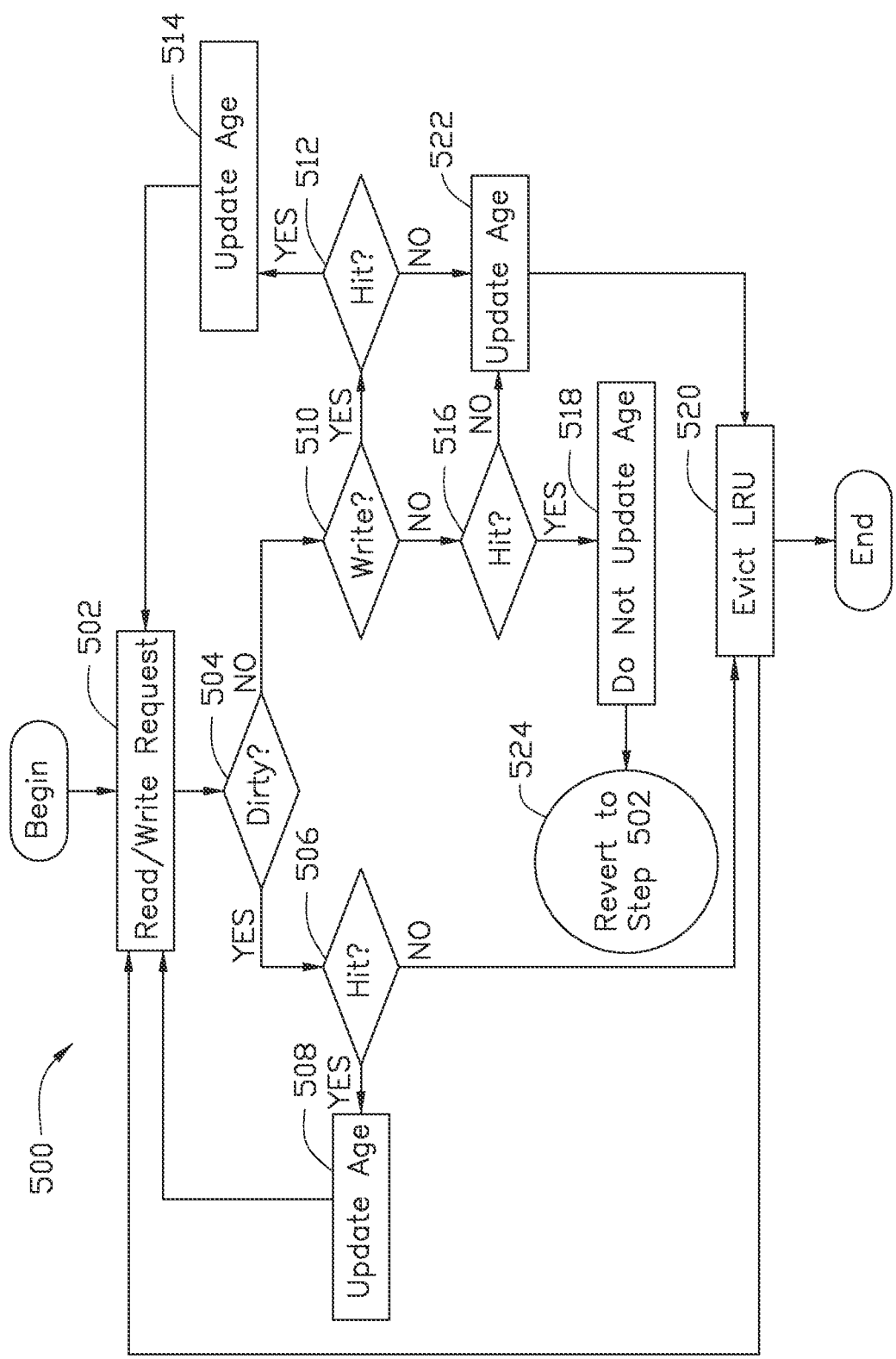
FIG. 5 illustrates a method for evicting cache lines from the lower level cache, according to another embodiment.

FIG. 5 illustrates a method 500 for evicting cache lines from the lower level cache, according to another embodiment. The method begins at step 502. At step 502, a read/write request comes to the lower level cache. At decision block 504, the processor determines whether the cache line is a clean cache line or a dirty cache line. If the cache line is a dirty cache line, then at decision block 506, the processor determines, whether there was a cache hit. If there was a cache hit, then at step 508, the processor updates the age of the cache line already in the lower level cache. If there was not a cache hit, then at step 520, the processor evicts the least recently used cache line because the read/write request is a new cache line entering the lower level cache.

If, however, at decision block 504 the processor determines that the cache line is a clean cache line, then the method 500 goes to decision block 510. At decision block 510 the processor determines whether the request is a read request or a write request. If the processor determines that the request was a write request, then the method moves to decision block 512 because cache lines for a write request will eventually become dirty, and a traditional least recently used approach may be used. At decision block 512, the processor determines whether a cache hit has occurred. If a cache hit has occurred, then at step 514 the age information of the cache line is updated. If the processor determines that a cache hit has not occurred, then at step 522 the age information of the cache line is updated and at step 520 the least recently used cache line is evicted from the lower level cache.

If at decision block 510, the processor determines that the request was a read request, then the method moves to decision block 516. At decision block 516, the processor determines whether a cache hit has occurred. If a cache hit has not occurred, then the age information of the cache line is updated at step 522. At step 520, the processor evicts the least recently used cache line. If, however, at decision block 516, the processor determines that a cache hit has occurred, then at step 518 the processor does not update the age information of the cache line. Essentially, method 400 is manipulating the age information of the clean cache lines to make sure that all clean cache lines have the same age information by only updating the age information of the clean cache lines one time, i.e. when the cache line first enters the lower level cache. After the processor does not update the age information of the cache line, then at step 524 the method 500 reverts to step 502.

Figure 6:
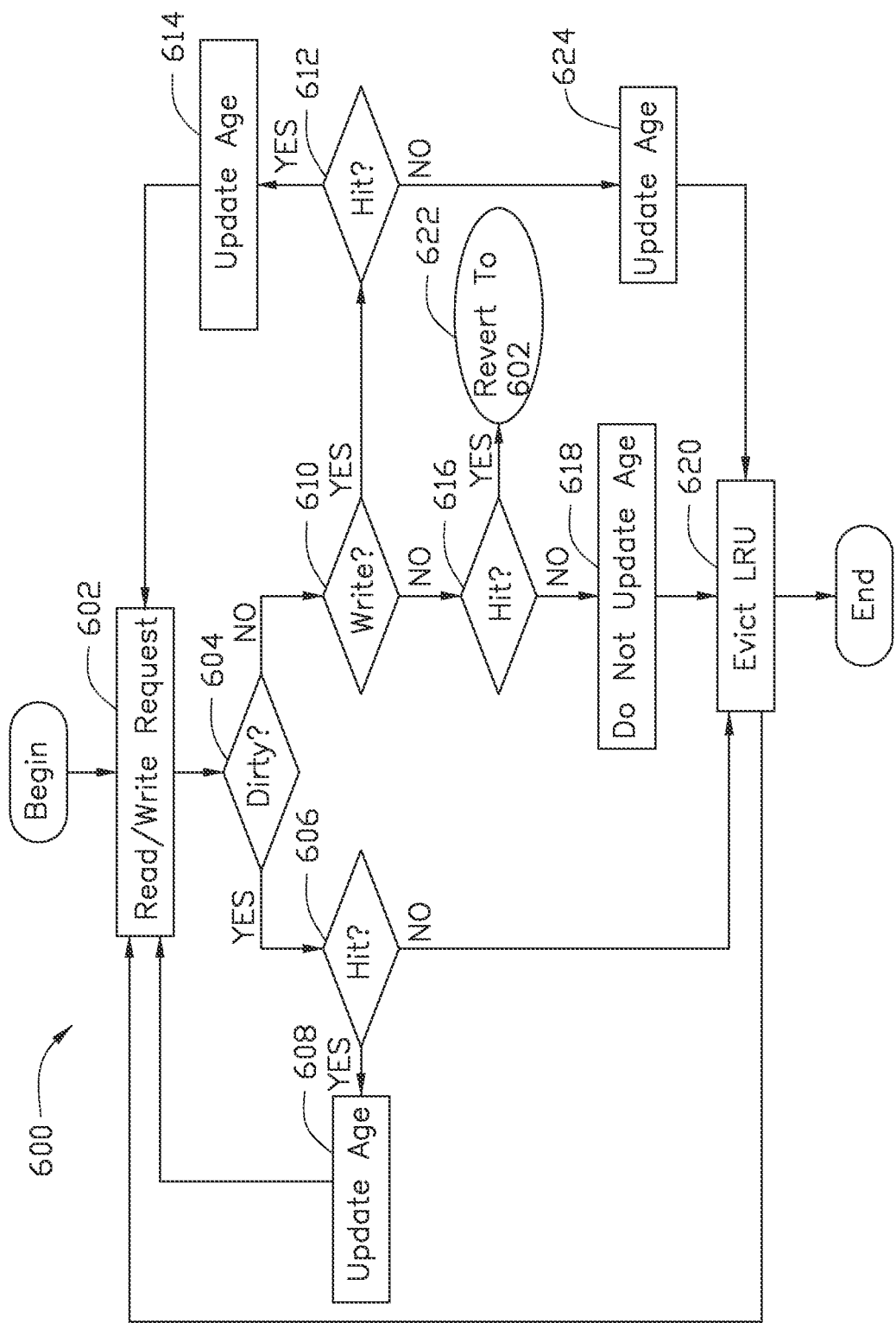
FIG. 6 illustrates a method for evicting cache lines from the lower level cache, according to another embodiment.

FIG. 6 illustrates a method 600 for evicting cache lines from the lower level cache, according to another embodiment. The method begins at step 602. At step 602, a read/write request comes to the lower level cache. At decision block 604, the processor determines whether the cache line is a clean cache line or a dirty cache line. If the cache line is a dirty cache line, then at decision block 606, the processor determines, whether there was a cache hit. If there was a cache hit, then at step 608, the processor updates the age of the cache line already in the lower level cache. If there was not a cache hit, then at step 620, the processor evicts the least recently used cache line because the read/write request is a new cache line entering the lower level cache.

If, however, at decision block 604 the processor determines that the cache line is a clean cache line, then the method 600 goes to decision block 610. At decision block 610 the processor determines whether the request is a read request or a write request. If the processor determines that the request was a write request, then the method moves to decision block 612 because cache lines for a write request will eventually become dirty, and a traditional least recently used approach should be used. At decision block 612, the processor determines whether a cache hit has occurred. If a cache hit has occurred, then at step 614 the age information of the cache line is updated. If, however, the processor determines that a cache hit has not occurred, then at step 624, the age information of the cache line is updated and at step 620 the least recently used cache line is evicted from the lower level cache.

If at decision block 610, the processor determines that the request was a read request, then the method moves to decision block 616. At decision block 616, the processor determines whether a cache hit has occurred. If a cache hit has occurred, then at step 622, the method 600 reverts to step 602. If at decision block 616, the processor determines that a cache hit has not occurred, then at step 618 the processor does not update the age information of the cache line. Essentially, method 600 is manipulating the age information of the clean cache lines by never updating their age information.

After the processor does not update the age information of the cache line, then at step 620 the processor evicts the least recently used cache line.

By manipulating the age information of the clean cache lines, the number of write-backs to the storage class memory is reduced. Reducing the number of write-backs to storage class memory improves the performance of storage class memory as a replacement of volatile memory as main memory. Thus, read latency can be increased through the use of storage class memory without reducing, or at least without significantly reducing, the write latency.

While the foregoing is directed to embodiments of the present disclosure, other and further embodiments of the disclosure may be devised without departing from the basic scope thereof, and the scope thereof is determined by the claims that follow.

What is claimed is:

1. A method for evicting at least one cache line from a lower level cache of a storage class memory, comprising:
   receiving at least one of a read and a write request at the storage class memory;
   upon receiving the at least one of the read and write request, determining if the at least one of the read and write request at the storage class memory is directed to a dirty cache line;
   upon determining the at least one of the read and write request is directed to a dirty cache line, determining if the at least one of the read and write request at the storage class memory is directed to a cache hit; and
   upon determining the at least one of the read and write request does not result in a cache hit:
      evicting from the lower level cache a least recently used cache line other than the dirty cache line; and
   returning to the receiving the at least one of the read and write request at the storage class memory.

2. The method according to claim 1, wherein the receiving the at least one of the read and write request at the storage class memory is at the lower level cache.

3. The method according to claim 1, wherein the storage class memory has three levels of cache.

4. The method according to claim 1, wherein the dirty cache line is line where there is a cache hit.

5. The method according to claim 1, further comprising:
determining if the at least one of the read and the write request at the storage class memory is a write request or a read request; and
determining if the at least one of the read and write request at the storage class memory is directed to a clean cache line.

6. The method according to claim 5, wherein the clean cache line is a line wherein there is not a cache hit.

7. The method according to claim 5, further comprising:
determining, through a processor, if a cache hit occurs when the at least one of the read and the write request is a write request.

8. The method according to claim 7, further comprising:
updating an age information of a cache line when the cache hit occurs.

9. The method according to claim 7, further comprising:
updating an age information of the cache line when a cache hit does not occur; and
evicting the least recently used cache line and returning to the receiving the at least one of the read and write request at the storage class memory.

10. The method according to claim 1, further comprising:
determining, through a processor, if a cache hit occurs when the at least one of the read and the write request is a read request.

11. The method according to claim 10, further comprising:
not updating an age of a cache line when a cache hit does not occur.

12. The method according to claim 11, further comprising:
evicting the least recently used cache line and returning to the receiving the at least one of the read and write request at the storage class memory.

13. The method according to claim 10, further comprising:
updating an age of a cache line when a cache hit does not occur.

14. The method according to claim 13, further comprising:
evicting the least recently used cache line and returning to the receiving the at least one of the read and write request at the storage class memory after updating the age of the cache line when the cache hit does not occur.

15. The method according to claim 10, further comprising:
not updating an age of a cache line when a cache hit occurs.

16. The method according to claim 15, further comprising:
reverting to receiving at least one of a read and a write request at the storage class memory after the not updating the age of the cache line when the cache hit occurs.

17. The method according to claim 10, further comprising:
reverting to receiving at least one of a read and a write request at the storage class memory when the cache hit occurs.

18. The method according to claim 10, further comprising:
when a cache hit does not occur, not updating an age of a cache line.

19. The method according to claim 18, further comprising:
evicting the least recently used cache line after not updating the age of a cache line.

20. The method according to claim 19, further comprising:
reverting to receiving at least one of a read and a write request at the storage class memory after the evicting the least recently used cache line.

21. An apparatus, comprising:
means for receiving at least one of a read and a write request at a storage class memory;
means for, upon receiving the at least one of the read and write request, determining if the at least one of the read and write request at the storage class memory is directed to a dirty cache line;
means for, upon determining the at least one of the read and write request is directed to a dirty cache line, determining if the at least one of the read and write request at the storage class memory is directed to a cache hit; and
means for, upon determining the at least one of the read and write request does not result in a cache hit, evicting from the lower level cache a least recently used cache line other than the dirty cache line.

22. The apparatus according to claim 21, further comprising:
processor means for determining, when a cache hit occurs when the at least one of the read and the write request is a read request.

23. An apparatus, comprising:
means for receiving at least one of a read and a write request at a memory;
means for, upon receiving the at least one of the read and write request, comparing the at least one read and write request to a memory to determine if the at least one of the read and write request at a storage class memory is directed to a dirty cache line;
means for, upon determining the at least one of the read and write request is directed to a dirty cache line, updating data associated with the at least one read and write request; and
means for, upon determining the at least one of the read and write request does not result in a cache hit, evicting from the lower level cache a least recently used cache line other than the dirty cache line.

24. The apparatus according to claim 23, wherein the memory is a storage class memory.

25. A method for evicting at least one cache line from a lower level cache of a storage class memory, comprising:
receiving at least one write request at the storage class memory;
upon receiving the at least one write request, determining if the at least one write request at the storage class memory is directed to a dirty cache line;
upon determining the at least one write request is directed to a dirty cache line, comparing the at least one write request to a cache;
upon comparing the at least one write request to a cache, determining if the at least one write request at the storage class memory is directed to a cache hit; and
upon determining the at least one write request does not result in a cache hit:

evicting from the lower level cache a least recently used cache line other than the dirty cache line; and returning to the receiving the at least one write request at the storage class memory.

26. An arrangement configured to evict at least one cache line in a write request from a lower level cache of a storage class memory, comprising:

means for receiving at least one write request at the storage class memory;

means for upon receiving the at least one write request, determining if the at least one write request at the storage class memory is directed to a dirty cache line;

processor means for, upon determining the at least one write request at the storage class memory is directed to a dirty cache line, comparing the at least one write request to a cache and for determining, when a dirty cache line is present, if the at least one write request at the storage class memory is directed to a cache hit; and means for, upon determining the at least one write request does not result in a cache hit:

evicting from the lower level cache a least recently used cache line other than the dirty cache line; and returning to the receiving the at least one write request at the storage class memory.

\* \* \* \* \*